Figure 1:
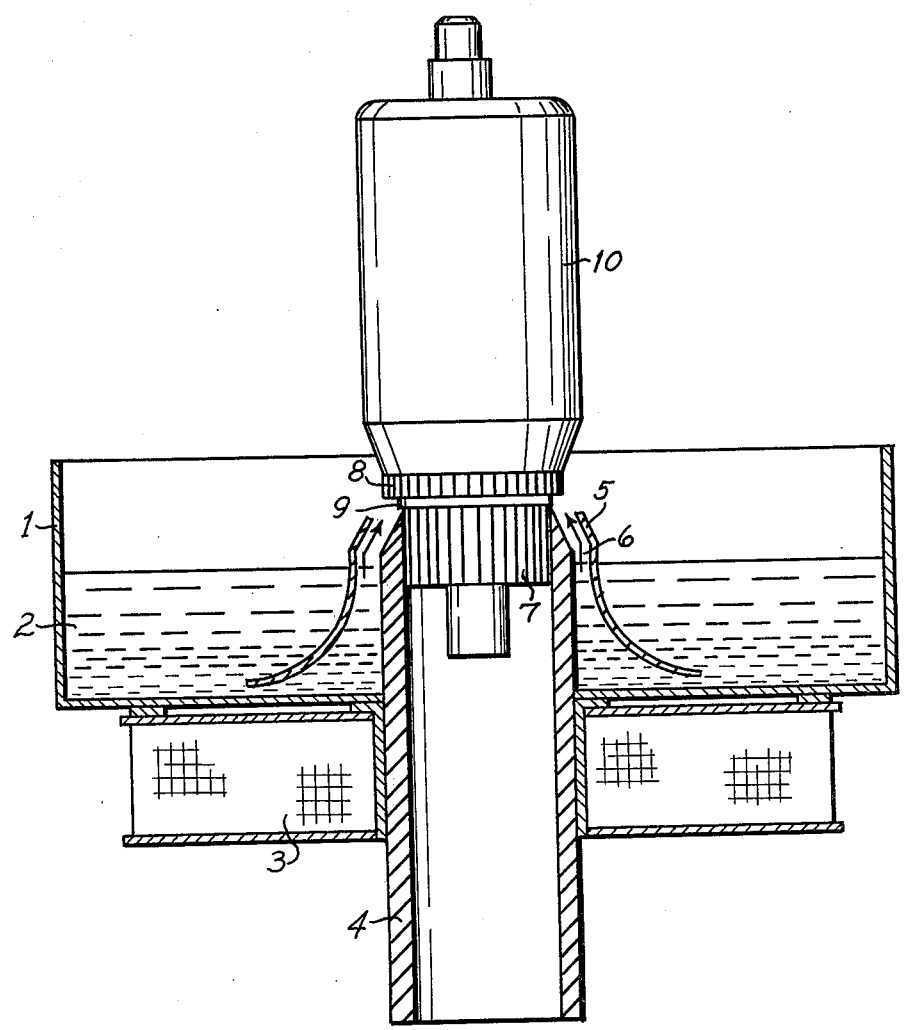

United States Patent

Minchev et al.

[11] 4,331,279
[45] May 25, 1982

[54] APPARATUS FOR SOLDERING THE COIL OF AN ELECTRIC MACHINE TO ITS COLLECTOR

[75] Inventors: Pavel M. Minchev; Hristomir D. Hristov; Stoyan R. Lazarov; Stoimen S. Balinov; Nikolay V. Yordanov, all of Sofia, Bulgaria

[73] Assignee: Institute po Metaloznanie i Technologia na Metalite, Sofia, Bulgaria

[21] Appl. No.: 164,001

[22] Filed: Jun. 30, 1980

[30] Foreign Application Priority Data

Jun. 28, 1979 [BG] Bulgaria .................................. 44122

[51] Int. Cl.³ ............................................. B23K 37/06
[52] U.S. Cl. ........................................ 228/37; 228/39
[58] Field of Search ...................... 228/33, 36, 37, 39, 228/260

[56] References Cited

U.S. PATENT DOCUMENTS

| 3,713,876 | 1/1973 | Lavric ................................ 228/37 X |
| 3,797,724 | 3/1974 | Flury et al. .......................... 228/37 |
| 4,106,066 | 7/1978 | Corsaro et al. .................... 228/37 X |

FOREIGN PATENT DOCUMENTS

| 2031493 | 1/1971 | Fed. Rep. of Germany ........ 228/37 |
| 627934 | 10/1978 | U.S.S.R. ................................. 228/37 |

Primary Examiner—Gil Weidenfeld
Assistant Examiner—Fred A. Silverberg

[57] ABSTRACT

Apparatus for soldering the wires of the coil on the armature of an electric machine to the commutator thereof. The apparatus has a device for clamping, shifting and fixing the armature, a monophase magnet-hydrodynamic pump with a charger and a pan with molten solder. The magnetic core of the pump has the shape of a hollow cylinder and is externally chamfered at its upper end. The armature to be soldered is disposed vertically with the lower portion of its commutator telescoped within the upper end of the core. Around the core within the pan there is an annular charger disposed coaxially of the core, the charger having its lower end above the bottom of the pan and its upper end on the level of the upper chamfered end of the core so as to form between the upper end of the charger and the upper chamfered end of the core an annular frusto-conical channel with a discharge end directed toward the upper portion of the commutator and the parts of the wires adjacent thereto to solder the wires to the commutator.

4 Claims, 2 Drawing Figures

APPARATUS FOR SOLDERING THE COIL OF AN ELECTRIC MACHINE TO ITS COLLECTOR

This invention relates to an apparatus for soldering the wires of an armature coil to the collector or commutator of an electric machine.

An installation for soldering the coil to the collector of an electric machine is known; this consists of a device for creating a flow of molten solder connected with a device for supporting and fixing the rotor in space, and a device for rotating the rotor around its axis. The soldering of the collector is accomplished by dipping the collector elements in the flow of molten solder, while at the same time rotating it steadily around its axis.

Disadvantages of this installation are its complex construction and the complex system for melting, heating and controlling the temperature of the solder, the great length of the molten metal flow, and the consequent increased electrical energy consumption.

Another installation for soldering the coil to the collector of an electric machine is known; this consists of a device for creating a flow of molten solder, in the form of a monophase magnet-hydrodynamic pump consisting of a coil and a cylindrical magnetic core, such device being connected to a pan, a charger with two nozzles, means for rotating the armature with its collector around its axis, and a device for clamping, shifting and fixing the armature with the collector in respect to the charger and the nozzles.

This installation is designed mainly for soldering the coil to a front type collector. Its operation requires the rotation of the rotor of the electric machine, a longer working cycle, and a greater electrical energy consumption.

The object of the present invention is to provide an apparatus for soldering the coil to the collector of an electrical machine, such apparatus having a simpler construction, a higher productivity, and a reduced energy consumption.

This object is achieved by an apparatus in accordance with the invention for soldering the coil to the collector of an electric machine, such apparatus consisting of a device for clamping, shifting and fixing the armature with respect to the collector, a monophase magnet-hydrodynamic pump, a charger, and a pan containing molten solder. The magnetic core of the monophase magnet-hydrodynamic pump is shaped as a hollow cylinder which is chamfered at its upper end. Around the core, coaxially thereof, there is placed the charger, the lower end of the charger being disposed above the bottom of the pan. The upper, chamfered end of the core is disposed at the same level as the upper end of the charger. Between the upper end of the charger and the chamfered end of the core is provided an annular channel which leads liquid solder at a predetermined angle toward the axis of the collector. In a preferred embodiment of the invention an adjustable, armature-supporting and centering element is disposed within the hollow core.

The advantages of the apparatus of the invention, in comparison with other known apparatus, are its high productivity as a result of the simultaneous soldering of all of the collector elements; the design and servicing of the apparatus are also simpler. The apparatus is of small dimensions, and works with a relatively small electrical energy consumption.

Figure 2:
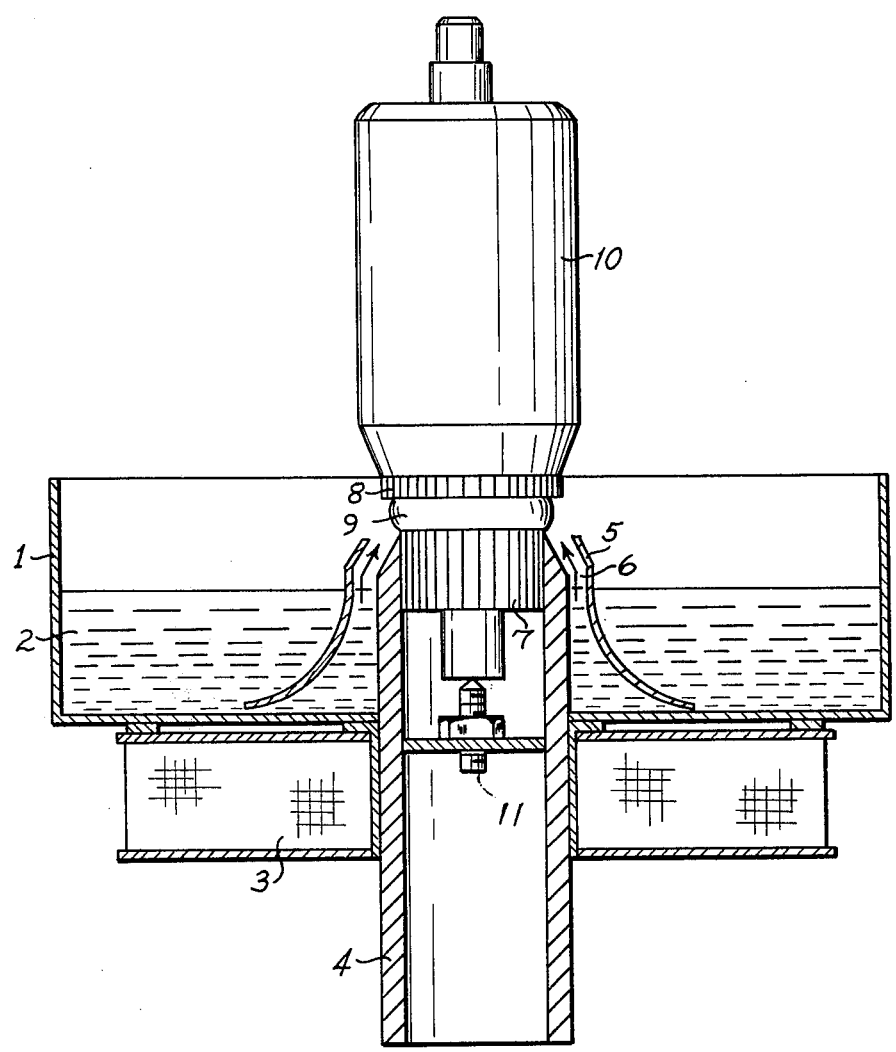

The invention will be explained in more detail with the aid of the accompanying drawings, wherein:

FIG. 1 is a view in vertical section through a first embodiment of the apparatus shown in its working mold; and FIG. 2 is a view in vertical section of a second embodiment of the apparatus of the invention, such apparatus being provided with an adjustable armature supporting and centering element.

Turning first to FIG. 1, under a pan 1 containing molten solder 2 there is disposed a monophase magnet-hydrodynamic pump 3, which has magnetic core in the shape of a hollow cylinder or sleeve which is externally shamfered on its upper end. Around the core 4 coaxially thereof there is disposed an annular charger 5, the lower end of which is disposed above the bottom of the pan 1, while the upper, smaller diameter end thereof is at the same level as the chamfered end of the core 4. The upper end of the charger 5 is of upwardly converging, frusto-conical shape parallel to the chamfer on the upper end of the core 4 so as to provide an annular channel 6 between the chamfered end of the core and the charger 5. The thus formed channel 6 is directed upwardly at a predetermined angle and has its upper, discharged end directed toward a segmented annular shoulder 8 having the segments thereof aligned with and forming parts of the segments of the collector 7 of the armature 10. The named, lower part of the collector is sealed from the molten solder supplied to the segments of the shoulder 8, to which wires (not shown) of the armature are to be soldered by an annular, heat resistant gasket 9 which may be made, for example, of asbestos. The weight of the armature 10 is born by the chamfered upper end of the core 4 acting through the gasket 9. The gasket thus effects a secure seal between the upper, chamfered end of the core 4 and the lower transverse edge of the segmented shoulder 8.

The apparatus of FIG. 1 functions as follows: the pan 1 is supplied with molten solder 2 which is maintained at the predetermined temperature by the heat produced by the functioning of the monophase magnet-hydrodynamic pump 3 and from electric resistance heaters (not shown) disposed around the cylindrical outer surface of pan 1. In armature 10 has a gasket 9 applied thereto as shown in FIG. 1, and the thus equipped armature is then mounted in the apparatus as shown. The monophase magnet-hydrodynamic pump 3 is then started. Pressure is created in the annular channel 6, under the action of which molten solder 2 flows upwardly pouring over the parts of the shoulder 8 and the wires to be connected thereto. The molten solder heats and enters the channels in the shoulder 8 and the ends of the wires, while the excess solder returns to the bath thereof in pan 1. After the soldering process has been completed, the pump 3 is switched off and remains so until the next armature 10 is mounted in the apparatus. As a result of the compression of the gasket 9, above referred to, molten solder cannot flow into the central opening in the core 4.

The second embodiment of the apparatus of the invention is shown in FIG. 2. Parts which are the same in FIG. 2 as those in FIG. 1 are designated by the same reference characters. The apparatus of FIG. 2 differs from that of FIG. 1 by having an adjustable centering and supporting means 11 for the armature 10 situated within the passage in the core 4. In this case, although the gasket 9 continues to seal the interior of the core 4 and the main, lower part of the collector 7 from the molten solder, it leaves the segmented shoulder 8, and the ends of the wires to be connected thereto, exposed to molten solder flowing upwardly to them through the channel 6.

The apparatus of the two functions in a manner quite similar to that of FIG. 1. Before placing the armature 10 in the apparatus, the gasket 9 is mounted thereupon in the position shown. Before mounting the armature 10 in the apparatus, the centering and supporting device 11 is appropriately adjusted by screwing the central, slotted screw thereof upwardly or downwardly, as the case may be. Means 11 carries most of the weight of the armature, but the gasket 9 sustains at least a small part of such weight so that it is compressed between the chamfered upper end of the core 4 and the shoulder 8. As before, the gasket 9 prevents the leakage of molten solder downwardly within the passage in core 4. The remainder of the soldering process is the same as that above described in connection with FIG. 1.

Although the invention has been illustrated and described with reference to preferred embodiments thereof, it is expressly understood that it is in no way limited to the disclosures of such preferred embodiments but is capable of numerous modifications within the scope of the appended claims.

We claim:

1. An apparatus for soldering the wires of the coil of an armature of an electric machine to the commutator thereof, comprising a pan containing molten solder, a monophase hydro-dynamic magnetic pump acting upon the molten solder, the pump having a vertically disposed magnetic core in the shape of a cylinder having a passage therein, the core having an externally chamfered upper end, the upper end of the passage in the core receiving the lower end of an armature there within with a first portion of the commutator on the armature disposed within the upper end of the passage in the core and a second portion of the armature with wires from the coil leading thereto disposed above the upper end of the core, an annular heat-resistant gasket disposed on the commutator between the first and second portions thereof and effecting a seal between the first portion of the commutator and the core, an annular charger surrounding the core disposed in the pan coaxial of the core, the charger having a lower end disposed above the bottom of the pan and a frusto-conical upper end cooperating with the chamfered upper end of the core to form with the chamfered upper end of the core a frusto-conical annular channel which discharges molten solder from its upper end unto the second portion of the commutator and the part of the wires adjacent thereto whereby to solder the wires to the commutator.

2. An apparatus according to claim 1, wherein the core extends downwardly to the bottom of the pan, and the pump has a coil surrounding the portion of the core beneath the bottom of the pan.

3. An apparatus according to claim 1, wherein the charger has a broad lower end portion which gradually converges upwardly to the lower entrance end of the solder feeding channel.

4. An apparatus according to claim 1, comprising an adjustable armature centering and supporting element within the passage in the core.

* * * * *